United States Patent
Tsukioka (10) Patent No.: US 7,072,068 B2
(45) Date of Patent: Jul. 4, 2006

(54) METHOD AND APPARATUS FOR PERFORMING MULTI-FUNCTION AND EFFECTIVELY MANAGING MEMORIES

(75) Inventor: Yasunori Tsukioka, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 961 days.

(21) Appl. No.: 09/992,948

(22) Filed: Nov. 5, 2001

(65) Prior Publication Data

US 2002/0097434 A1 Jul. 25, 2002

(30) Foreign Application Priority Data

Nov. 10, 2000 (JP) .............................. 2000-343855
Mar. 27, 2001 (JP) .............................. 2001-089835

(51) Int. Cl.
*G06F 15/00* (2006.01)
*G06K 1/00* (2006.01)
*G06K 15/00* (2006.01)

(52) U.S. Cl. ................... 358/1.16; 358/1.15; 358/1.16; 358/1.17; 358/444

(58) Field of Classification Search ............... 358/1.16, 358/1.15, 1.17, 444

See application file for complete search history.

(56) References Cited

U.S. PATENT DOCUMENTS

| 5,461,704 | A | * | 10/1995 | Wakabayashi et al. ..... 358/1.15 |
| 6,108,100 | A | * | 8/2000 | McVey et al. ............. 358/1.16 |
| 6,226,099 | B1 | * | 5/2001 | Sugaya ..................... 358/1.16 |
| 6,538,764 | B1 | * | 3/2003 | Ueda ......................... 358/1.16 |

* cited by examiner

*Primary Examiner*—Edward L. Coles
*Assistant Examiner*—Yixing Qin
(74) *Attorney, Agent, or Firm*—Cooper & Dunham LLP (57) ABSTRACT

A multi-function apparatus includes a basic memory, a socket, and a controller. The basic memory includes at least a first image memory area for a copying function and a second image memory area for a facsimile function. The socket connects an add-on expansion memory. The controller arranges memory assignments of the basic memory in accordance with a first memory map to perform operations of the copying and facsimile functions when the expansion memory is not mounted to the socket. The controller rearranges the memory assignments of the basic memory and of the expansion memory with an effect of expanding the first and second image memory areas in accordance with a second memory map to perform the operations of the copying and facsimile functions when the expansion memory is mounted to the socket.

30 Claims, 11 Drawing Sheets

METHOD AND APPARATUS FOR PERFORMING MULTI-FUNCTION AND EFFECTIVELY MANAGING MEMORIES

BACKGROUND

1. Field

This patent specification relates to a method and apparatus for multi-function performance, and more particularly to a method and apparatus for multi-function performance capable of effectively managing memories.

2. Description of Related Art

Conventionally, multi-function apparatuses capable of performing at least copying and facsimile functions are provided with a copier image memory area for a copying function and a facsimile image memory area for a facsimile function. These multi-function apparatuses often are capable of executing sophisticated functions such as a sorting copy, a memory transmission, and so on. In a typical sorting copy, for example, reading of all the originals is first performed. Then, the image data read from the respective original pages are encoded and compressed, and the resultant compressed image data are accumulated into the copying image memory area. After that, the image data are reproduced according to a designated number of reproductions which are collated and ejected into sorting trays. In a typical memory transmission, for another example, data of image information to be transmitted or which have been received are accumulated into the facsimile image memory area during a broadcasting transmission, a confidential transmission, or a proxy receiving when a memory transmission mode is selected.

In the above-described sorting copy, a maximum number of reproducible originals in a single task of the sorting copy depends mostly on a data capacity of the copying image memory area although it also depends on complexity of the images contained in the originals. This situation would be applied also to the memory transmission. That is, a maximum number of transmittable originals in a single task of the memory transmission depends mostly on a data capacity of the facsimile image memory area.

Conventionally, a multi-function apparatus is configured to have an add-on expansion memory so as to increase a maximum page number of reproducible originals in the sorting copy. In this case, however, the expansion memory is used only for the copying function. To increase the data capacities of both copying and facsimile image memory areas, two separate expansion memories are required, which would lead to an increase of an apparatus cost.

SUMMARY

This patent specification describes a novel multi-function apparatus performing at least copying and facsimile functions. In one example, a novel multi-function apparatus includes a basic memory, a socket, and a controller. The basic memory includes at least a first image memory area for storing data of the copying function and a second image memory area for storing data of the facsimile function. The socket connects an add-on expansion memory. The controller is configured to arrange memory assignments of the basic memory in accordance with a first memory map to effectively perform operations of the copying and facsimile functions when the expansion memory is not mounted to the socket. The controller is also configured to rearrange the memory assignments of the basic memory together with the expansion memory with an effect of expanding the first and second image memory areas of the basic memory in accordance with a second memory map to effectively perform the operations of the copying and facsimile functions when the expansion memory is mounted to the socket.

The above-described multi-function apparatus may further include a backup battery that energizes the basic memory while other power to the apparatus is turned off. In this case, the second image memory area is allocated within the basic memory when the expansion memory is mounted to the socket.

The controller may return an arrangement of the memory assignments from that in accordance with the second memory map to the other in accordance with the first memory map when the expansion memory is removed from the socket.

The controller may indicate a user guidance providing a notice that the expansion memory is installed to the socket while the second image memory area retains effective image data therein.

The controller may indicate a user guidance providing a notice that the expansion memory is removed from the socket while the second image memory area retains effective image data therein.

Further, this patent specification describes another novel multi-function apparatus that performs at least a copying function and an optional facsimile function. In one example, this multi-function apparatus includes a basic memory, a socket, and a controller. The basic memory includes at least a first image memory area for storing data of the copying function. The socket connects an add-on expansion memory. The controller is configured to arrange memory assignments of the basic memory and the expansion memory in accordance with a predetermined memory map so that a second image memory area for the optional facsimile function is allocated within the basic memory when the expansion memory is mounted to the socket and the optional facsimile function is added to the apparatus.

The above-described multi-function apparatus may further include a backup battery that backs up the basic memory.

The second image memory area has a memory size which may be determined by a user.

Further, this patent specification describes a novel method for multi-function performance of at least copying and facsimile functions. In one example, a novel method for multi-function performance includes the steps of providing, preparing, arranging, and rearranging. The providing step provides a basic memory including a first memory area for storing data of the copying function and a second memory area for storing data of the facsimile function. The preparing step prepares a socket for connecting an expansion memory. The arranging step arranges memory assignments of the basic memory in accordance with a first memory map to effectively perform operations of the copying and facsimile functions when the expansion memory is not mounted to the socket. The rearranging step rearranges the memory assignments of the basic memory together with the expansion memory with an effect of expanding the first and second memory areas storing the data of the copying and of facsimile functions in accordance with a second memory map to effectively perform the operations of the copying and facsimile functions when the expansion memory is mounted to the socket.

The above-described method may further include a step of energizing at least the basic memory while other power to the multi-function performance is turned off.

The above-described method may further include a step of returning an arrangement of the memory assignments from that in accordance with the second memory map to the other in accordance with the first memory map when the expansion memory is removed from the socket.

The above-described method may further include a step of providing a user guidance with a notice that the expansion memory is installed to the socket while the second memory area retains effective image data therein.

The above-described method may further include a step of providing a user guidance with a notice that the expansion memory is removed from the socket while the second memory area retains effective image data therein.

Further, this patent specification describes another method for multi-function performance of at least a copying function and an optional facsimile function. In one example, a method for multi-function performance includes the steps of providing, preparing, and arranging. The providing step provides a basic memory for storing data of the copying function. The preparing step prepares a socket for connecting an add-on expansion memory. The arranging step arranges memory assignments of memory areas of the basic memory and the expansion memory in accordance with a predetermined memory map so that a specific memory area for the optional facsimile function is allocated within the basic memory when the expansion memory is mounted to the socket and the optional facsimile function is made available.

The above-described method may further include a step of energizing at least the basic memory while other power to the multi-function performance is turned off.

The specific memory area has a memory area which may be determined by a user.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents which operate in a similar manner.

Figure 1:
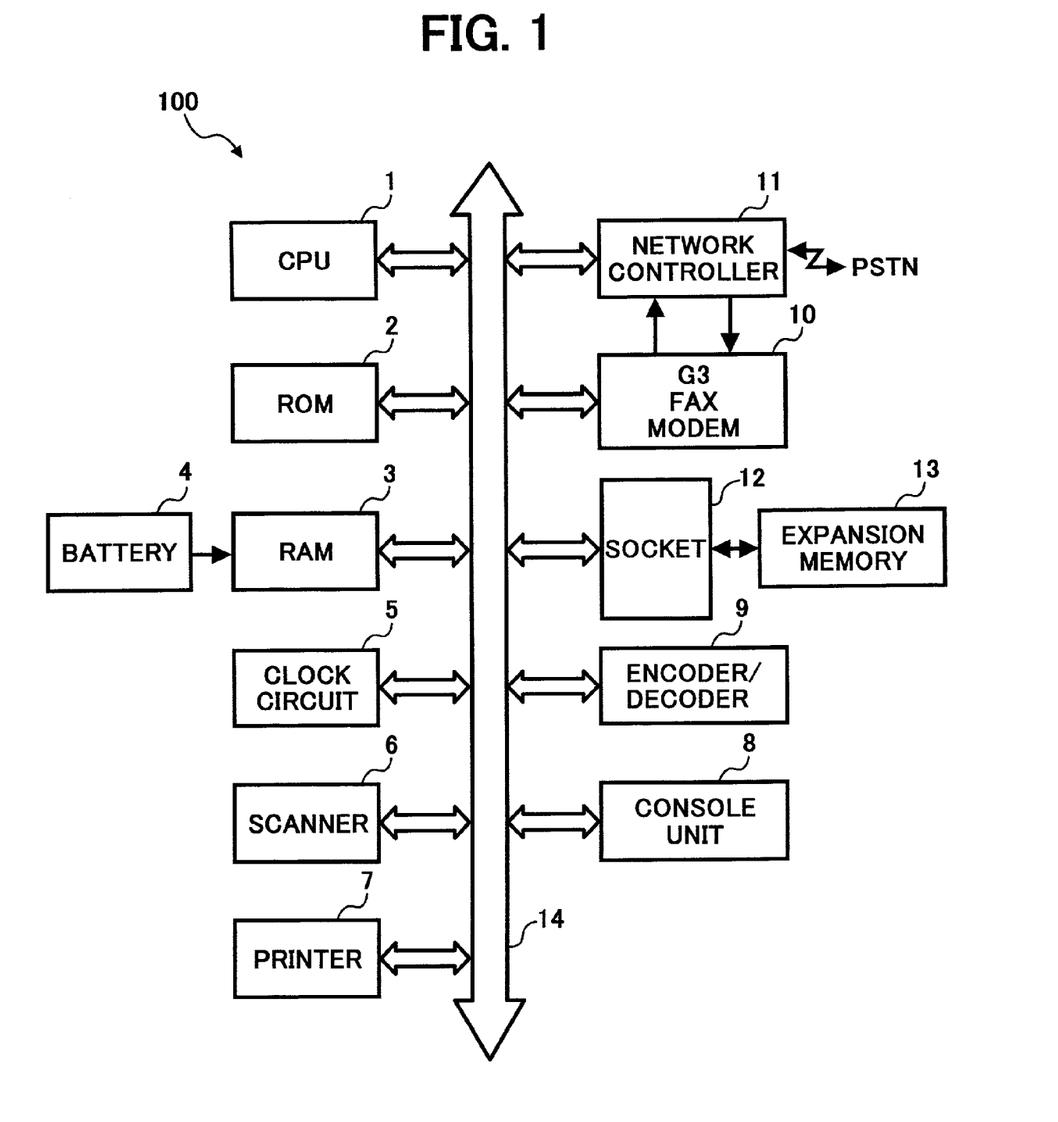
FIG. 1 is a schematic diagram of a multi-function apparatus according to a preferred embodiment.

Referring now to the drawings, wherein like reference numerals designate identical or corresponding parts throughout the several views, and more particularly to FIG. 1 thereof, a multi-function apparatus 100 according to a preferred embodiment is explained. The multi-function apparatus 100 is provided at least with a digital copying function and a Group-III facsimile (G3 FAX) function. As shown in FIG. 1, the multi-function apparatus 100 includes a CPU (central processing unit) 1, a ROM (read only memory) 2, a RAM (random access memory) 3, a battery 4, a clock circuit 5, a scanner 6, and a printer 7. The multi-function apparatus 100 further includes a console unit 8, an encoder/decoder 9, a G3 FAX modem 10, a network controller 11, a socket 12, an expansion memory 13, and an internal bus 14.

The CPU 1 is employed as a controller for controlling respective components of the multi-function apparatus 100 to perform a predetermined copying function and a predetermined G3 FAX facsimile function. The ROM 2 stores programs (i.e., an operation system, applications programs, etc.) executed by the CPU 1, a variety of data required for the CPU 1 to execute the programs, and so on. The RAM 3 is employed as a basic memory and has a memory capacity of 8 MB (megabyte), for example. The RAM 3 basically includes three memory areas by functional allocation as and when needed; a working memory area for the CPU 1 to use, a copying image memory area, and a facsimile image memory area. In addition, the RAM 3 stores a variety of information inherent to the multi-function apparatus 100. The battery 4 backs up the RAM 3. The clock circuit 5 calculates and outputs current time information.

The scanner 6 reads an original image at a predetermined resolution. The printer 7 records and outputs an image at a predetermined resolution. The console unit 8 includes a variety of operation keys (not shown) and a variety of indicators (not shown) which are provided for a user to operate the multi-function apparatus 100. The encoder/decoder 9 encodes, or compresses, image data and decodes encoded, or compressed, image information to original image data.

The G3 FAX modem 10 implements a modem functionality with respect to the Group-III facsimile standard and has a lower speed model function (i.e., a V.21 modem) for communicating transmission procedure signals and a higher speed model function (i.e., a V.17 modem, a V.34 modem, a V.29 modem, a V.27ter Modem, or the like) for mainly communicating image information. The network controller 11 is provided to connect the multi-function apparatus 100 to an analog public switched telephone network (PSTN) and has an automatic call-initiation and call-receiving function. The socket 12 electrically connects an optional add-on expansion memory card (i.e., the expansion memory 13) to the multi-function apparatus 100. The expansion memory 13 contains 4-MB memory banks 21–28, for example, which has a memory capacity of 32 MB in total, and it can be installed to and removed from the socket 12, by a user's choice.

The internal bus 14 interconnects the CPU 1, the ROM 2, the RAM 3, the clock circuit 5, the scanner 6, the printer 7, the console unit 8, the encoder/decoder 9, the G3 FAX modem 10, the network controller 11, and the socket 12 so that these components perform communications of data with each other mainly through the internal bus 14. On the other hand, the network controller 11 and the G3 FAX modem 10 perform communications of data directly therebetween. The expansion memory 13 is also interconnected to the internal bus 14 via the socket 12 so that the CPU 1 is able to use the expansion memory 13 when necessary.

Figure 2:
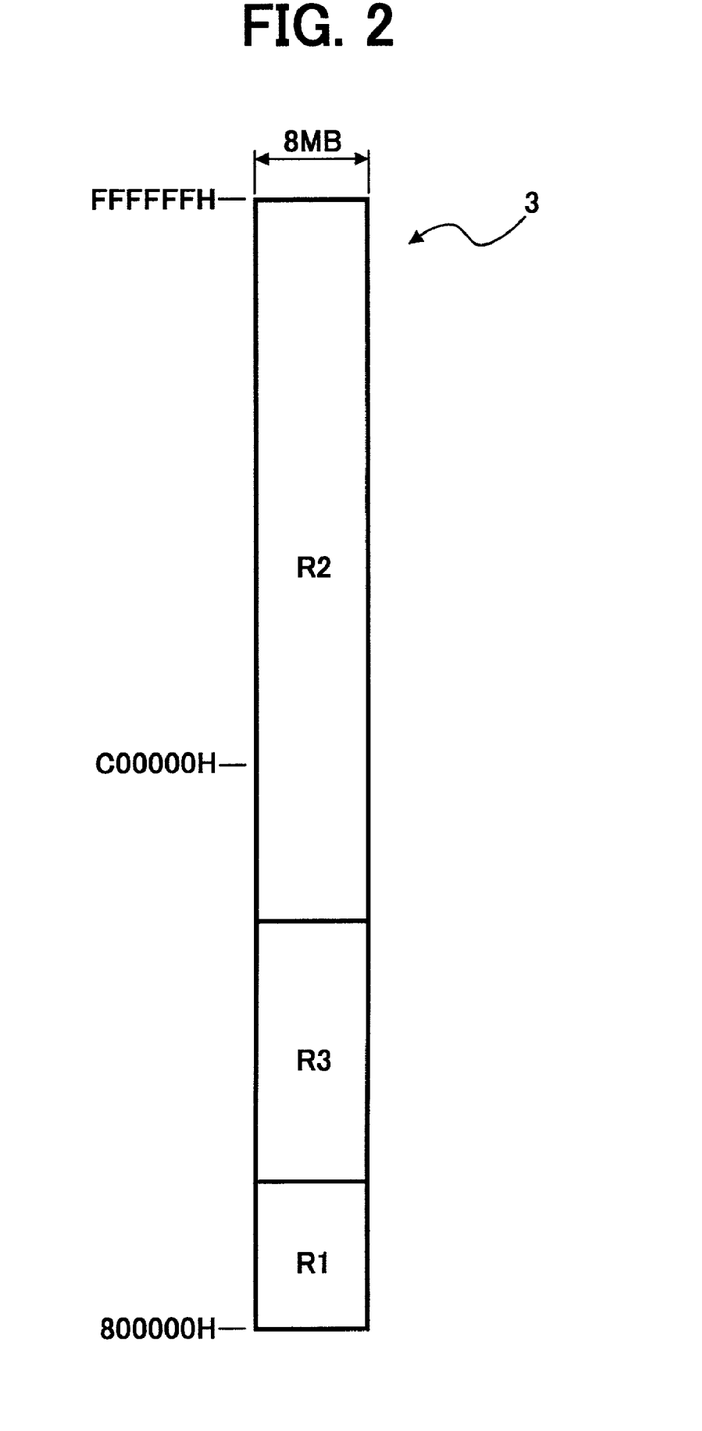
FIG. 2 is an illustration for explaining an exemplary memory map of a RAM (random access memory) when an add-on optional expansion memory is not mounted to the multi-function apparatus of FIG. 1.

In the present preferred embodiment, the working memory area for the CPU 1 is differently assigned in the RAM 3 between the cases when the expansion memory 13 is employed in the multi-function apparatus 100 and when it is not. FIG. 2 illustrates an exemplary memory map of the RAM 3 which shows memory assignments of the RAM 3 when the expansion memory 13 is not employed in the multi-function apparatus 100. The RAM 3 is divided by functional allocation into memory areas R1, R2, and R3, as shown in FIG. 2. The memory area R1 stores image data (i.e., image information) associated with the facsimile functions. The memory area R1 may be referred to as a SAF (stored and forward) memory. The memory area R2 stores a page of image data which will be recorded on the printer 7, and may be referred to as a page memory. The memory area R3 is reserved as a working memory for the CPU 1. In the RAM 3 having the memory capacity of 8 MB, memory sizes of 1 MB, 5.3 MB, and 1.7 MB maybe assigned to the memory areas R1, R2, R3, respectively, for example.

Figure 3:
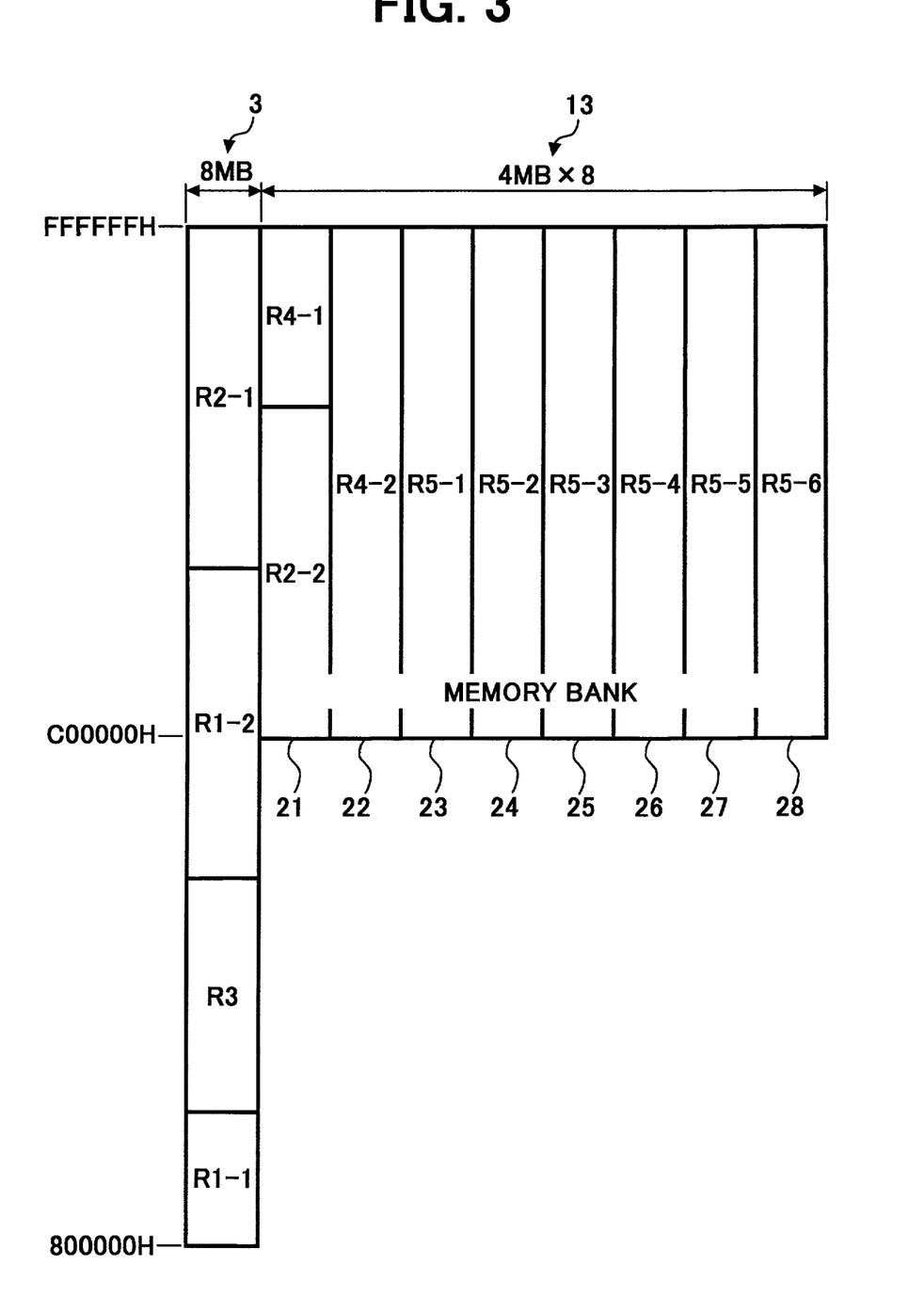
FIG. 3 is an illustration for explaining an exemplary memory map of the RAM and the add-on optional expansion memory mounted to the multi-function apparatus of FIG. 1.

FIG. 3 illustrates an exemplary memory map of the RAM 3 added with the expansion memory 13, which shows memory assignments by functional allocation of the RAM 3 and the expansion memory 13 when the expansion memory 13 is installed in the multi-function apparatus 100. The RAM 3 is divided by functional allocation into memory areas R1-1, R3, R1-2, and R2-1 such that the memory areas R1-1, R3, R1-2, and R2-1 have, for example, 1 MB, 1.4 MB, 3 MB, and 2.6 MB, respectively. The memory areas R1-1 and R1-2 store facsimile image information. The memory area R2-1 stores a page of image data which will be recorded on the printer 7. The memory area R3 is used as a working memory area by the CPU 1.

The expansion memory 13 illustrated in FIG. 3 includes 4-MB memory banks 21–28, for example, which has the memory capacity of 32 MB in total and in which a data access is carried out, for example, with a bank mapping operation. The memory bank 21 is divided by functional allocation into a memory area R2-2 having, for example, 2.7 MB for use in the copying function and a memory area R4-1 having, for example, 1.3 MB for accumulating pages of images for the copying function. The memory bank 22 is assigned as a memory area R4-2 for accumulating pages of images. The remaining memory banks 23–28 having 24 MB in total are assigned as memory areas R5-1, R5-2, R5-3, R5-4, R5-5, and R5-6, respectively, which are used for the copying function in a sorting mode.

Consequently, in the present embodiment, the memory area R1 for storing facsimile images is composed of the functionally allocated memory areas R1-1 and R1-2 and has a memory capacity of 4 MB in total, which is 3 MB greater than the memory capacity of the memory area R1 of FIG. 2. As shown in FIG. 3, the memory areas R1-1 and R1-2 are located in the RAM 3 backed up with the battery 4 and therefore the accumulated image data associated with the facsimile function are safely retained even when other power to the apparatus is turned off. With this configuration, the multi-function apparatus 100 can properly perform special facsimile functions such as a facsimile transmission with time designation, a facsimile transmission with confidentiality, and a proxy facsimile receiving.

Furthermore, in the present preferred embodiment, the multi-function apparatus 100 handles the memory areas R2-1 and R2-2 as one memory area R2 and allows data access to such memory area R2. Likewise, the memory areas R4-1 and R4-2 are handled as one memory area R4 and, also, the memory areas R5-1, R5-2, R5-3, R5-4, R5-5, and R5-6 are handled as one memory area R5.

In this embodiment, the CPU 1 uses the memory area R4 together with the memory area R2 as double buffers for the copying function. This enables the CPU 1 to perform operations of reading and storing image data from an original in parallel to operations of reading and reproducing image data from the memory, thereby increasing a processing speed of the copying operation. The CPU 1 uses the memory area 5 for the copying function in the sorting mode. For example, during the copying function in the sorting mode, the CPU 1 stores data read from originals into the memory area 5 after encoding and compressing the read data.

It should be noted that the power to the multi-function apparatus 100 should be turned off when the above-described expansion memory 13 is installed to or removed from the multi-function apparatus 100. Accordingly, the CPU 1 should check presence of the expansion memory 13 during an initialization operation at a power-up time.

Figure 4A:
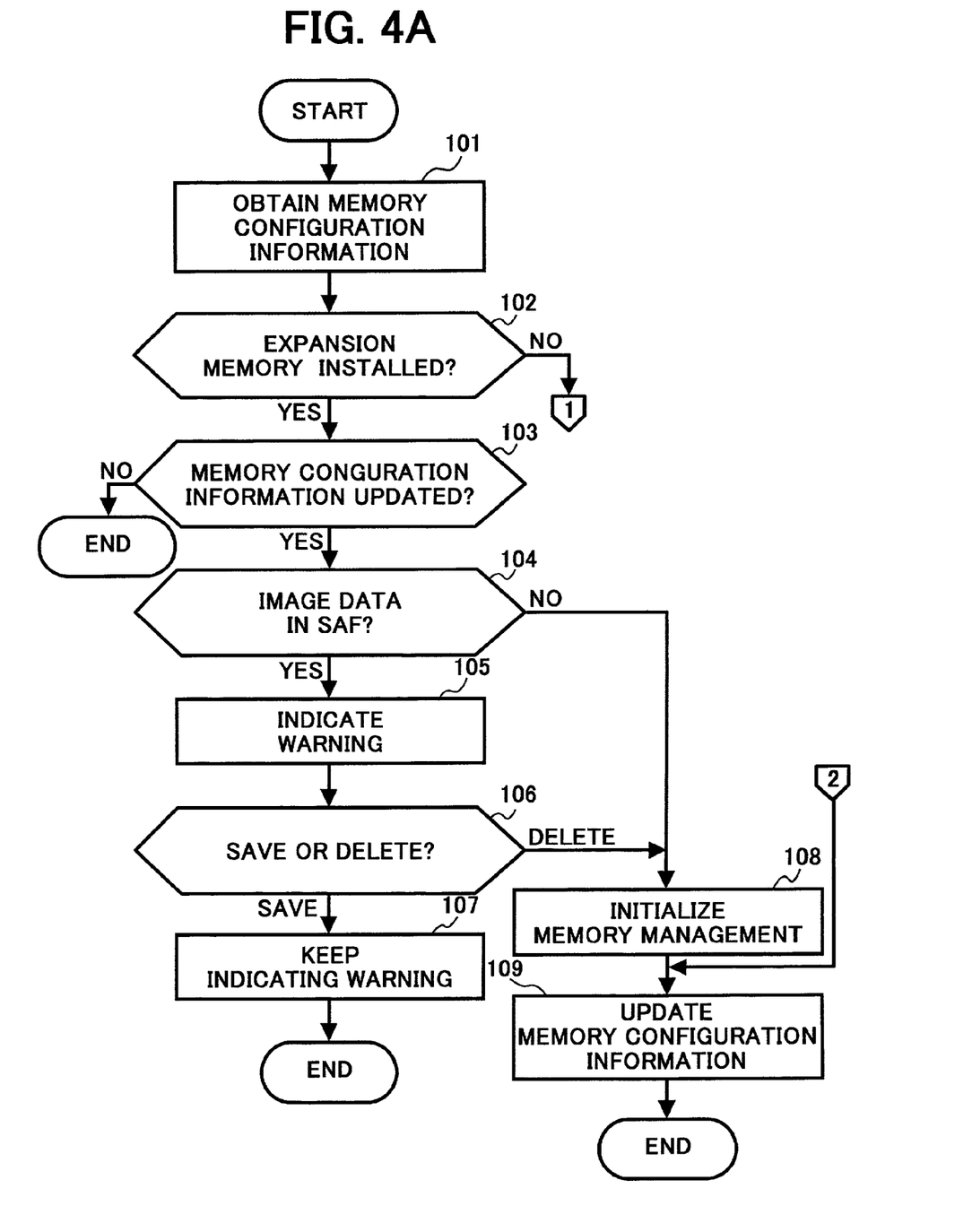
FIGS. 4A and 4B are flowcharts for explaining an exemplary procedure of an initialization process performed by the multi-function apparatus of FIG. 1.
Figure 4B:
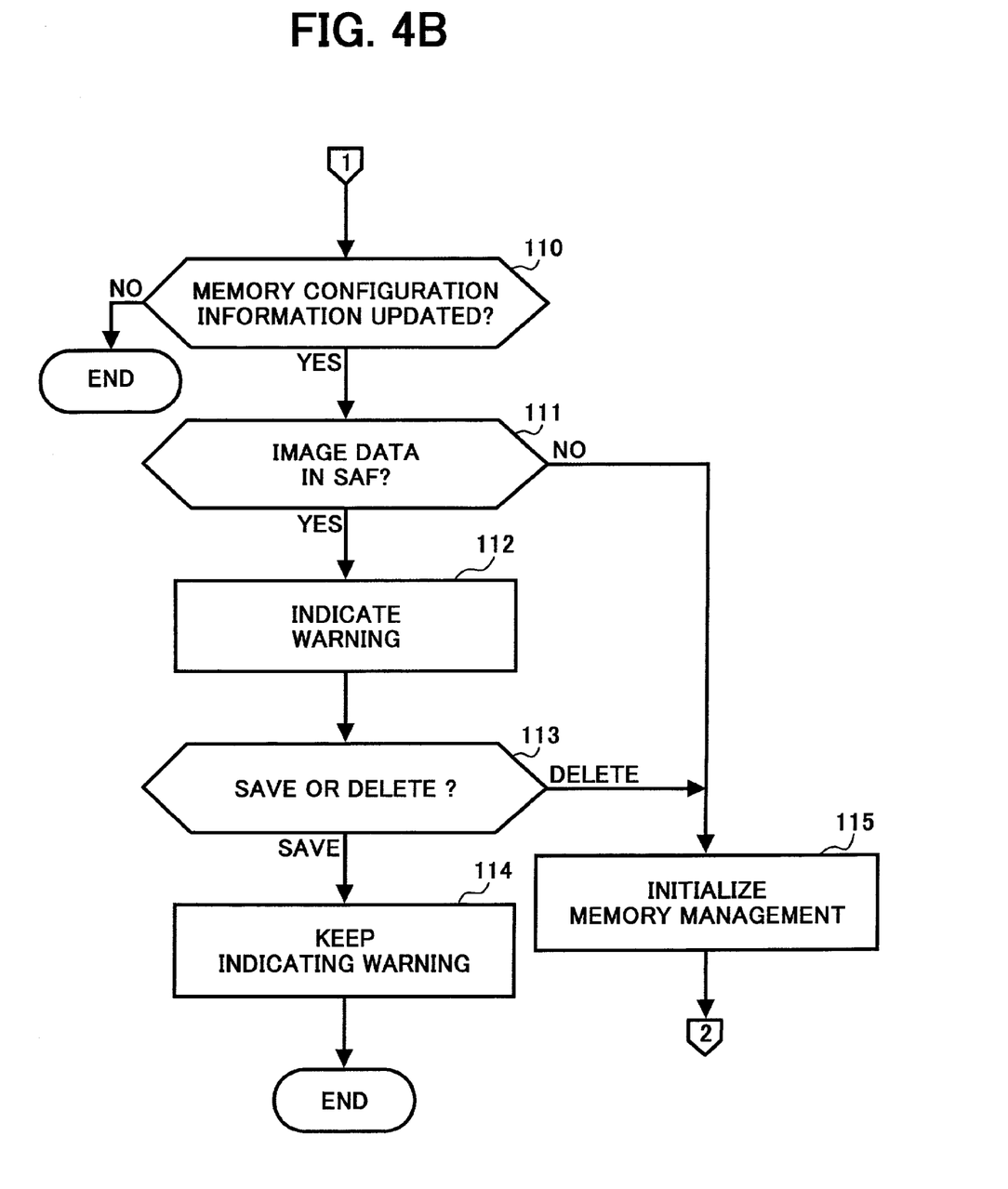

Referring to FIGS. 4A and 4B, an exemplary procedure of an initialization operation performed by the multi-function apparatus 100 is explained. As illustrated in FIG. 4A, when the initialization operation is started, the CPU 1 obtains memory configuration information in Step S101 and checks whether or not the expansion memory 13 is actually installed in Step S102. If the check result of Step S102 is YES, the CPU 1 checks in Step S103 whether the memory configuration information is updated and properly corresponds to an actual configuration in that the expansion memory 13 is installed as checked out in Step S102. If the check result of Step S103 is NO, the CPU 1 determines that the memory configuration information is not updated in accordance with the actual configuration and stops the process.

If the memory configuration information is updated and the check result of Step S103 is YES, the process proceeds to Step S104. The CPU 1 checks in Step S104 if the SAF memory (i.e., the memory area R1) reserved in the RAM 3 stores effective image data. If the check result of Step S104 is YES, the CPU 1 instructs the console unit 8 in Step S105 to provide notice that unknown image data remains in the SAF memory. Then, in Step S106, the CPU 1 checks whether in response to the warning notice a user inputs an instruction for saving or deleting the unknown image data remaining in the SAF memory. When the user inputs a saving instruction and the check result of Step S106 is "SAVE," the CPU 1 instructs the console unit 8 in Step S107 to keep on indicating the warning and ends the process.

When the user inputs a deleting instruction and the check result of Step S106 is "DELETE," the CPU 1 proceeds to Step S108 in which the CPU 1 initializes a memory management under conditions that the expansion memory 13 is installed, as illustrated in FIG. 3. Subsequently, in Step S109, the CPU 1 updates the memory configuration information into conditions that the expansion memory 13 is installed, as illustrated in FIG. 3. Then, the CPU 1 ends the process. Likewise, when effective image data is not stored in the SAF memory of the RAM 3 and the check result of Step S104 is NO, the CPU 1 also performs the processes of Steps S108 and S109 and then ends the process.

If the expansion memory 13 is not actually installed and the check result of Step S102 is NO, the process proceeds to Step S110 of FIG. 4B. In Step S110, the CPU 1 checks whether the memory configuration information is updated and properly corresponds to an actual configuration in that the expansion memory 13 is not installed as checked out in Step S102. If the check result of Step S110 is NO, the CPU 1 determines that the memory configuration information is not updated in accordance with the actual configuration and stops the process.

If the memory configuration information is updated and the check result of Step S110 is YES, the process proceeds to Step S111. The CPU 1 checks in Step S111 if the SAF memory (i.e., the memory area R1) reserved in the RAM 3 stores effective image data. If the check result of Step S111 is YES, the CPU 1 instructs the console unit 8 in Step S112 to provide a warning notice that unknown image data remains in the SAF memory. Then, in Step S113, the CPU 1 checks whether in response to the warning a user inputs an instruction for saving or deleting the unknown image data remaining in the SAF memory. When the user inputs a saving instruction and the check result of Step S113 is "SAVE," the CPU 1 instructs the console unit 8 in Step S114 to keep on indicating the warning and ends the process.

When the user inputs a deleting instruction and the check result of Step S113 is "DELETE," the CPU 1 proceeds to Step S115 in which the CPU 1 initializes a memory management under conditions that the expansion memory 13 is installed, as illustrated in FIG. 3. Subsequently, the process proceeds to Step S109 (FIG. 4A) in which the CPU 1 updates the memory configuration information into conditions that the expansion memory 13 is not installed, as illustrated in FIG. 2. Then, the CPU 1 ends the process. Likewise, when effective image data is not stored in the SAF memory of the RAM 3 and the check result of Step S111 is NO, the CPU 1 also performs the processes of Steps S115 and S109 (FIG. 4A) and then ends the process.

In this way, the multi-function apparatus 100 provides a warning indication to the user in an event that an effective image information file is retained in the SAF memory (i.e., the memory area R1) after the expansion memory 13 is installed or removed. Thereby, the user can appropriately perform the installation or removal of the expansion memory 13.

It should be noted that the memory capacity of the expansion memory 13 may not be limited to 32 MB which is used as an exemplary memory capacity in the foregoing description. Also, it should be noted that the entire page memory (i.e., the memory area R2) may be allocated in the expansion memory 13 since the data stored in the page memory may usually not be used when the power to the multi-function apparatus 100 is turned off although in the foregoing description the page memory is partly allocated in the RAM 3 in a memory map with the expansion memory 13 installed.

Furthermore, it should be noted that the multi-function apparatus 100 may include a Group IV facsimile function as well as the copying function with or without a printer function although the multi-function apparatus 100 includes the Group III facsimile function and the copying function in the foregoing description.

Figure 5:
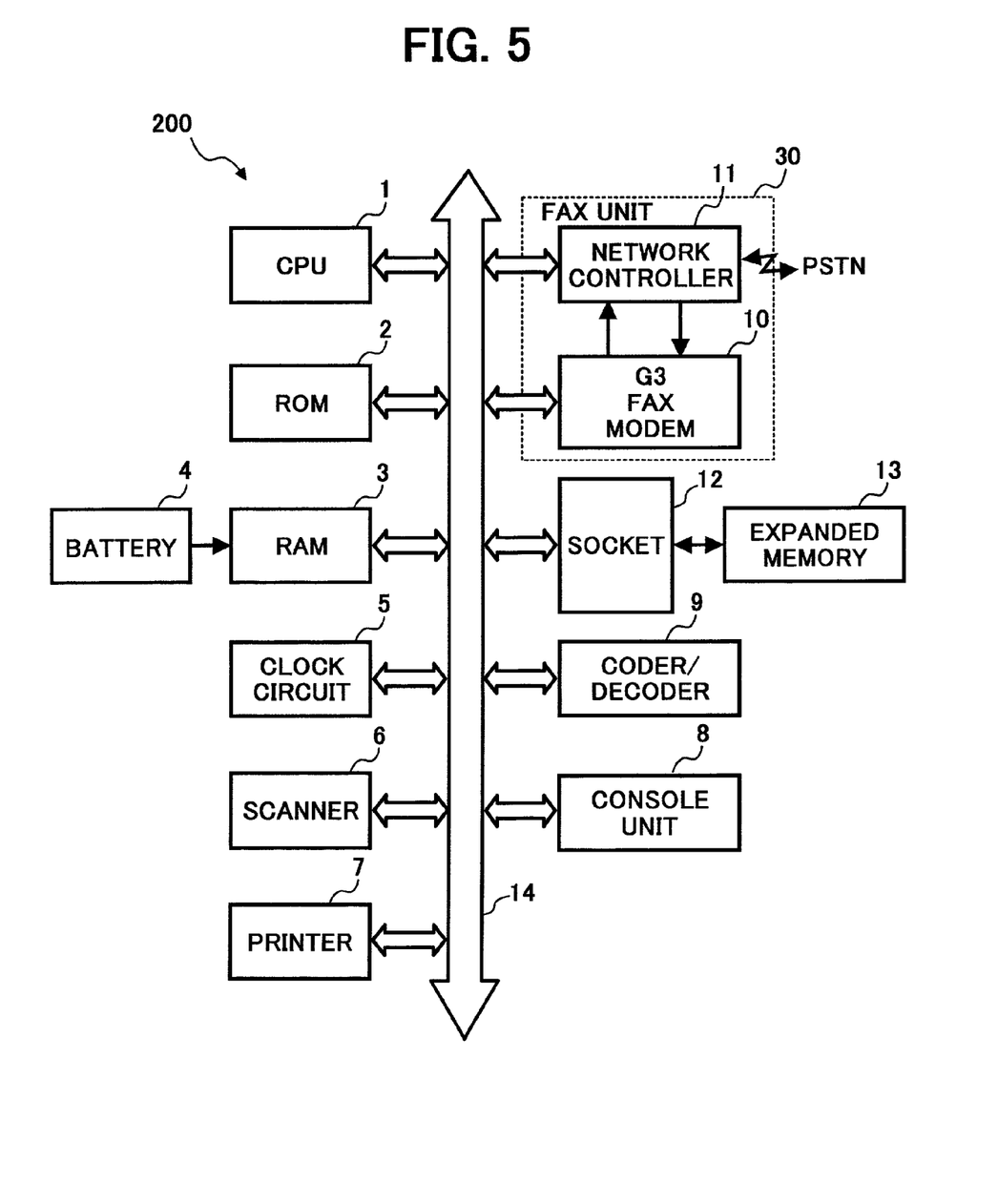
FIG. 5 is a schematic diagram of a multi-function apparatus according to another preferred embodiment.

Referring to FIG. 5, a multi-function apparatus 200 according to another embodiment is explained. The multi-function apparatus 200 is similar to the multi-function apparatus 100 illustrated in FIG. 1, except for an optional facsimile unit 30. The multi-function apparatus 200 is configured to perform at least a copying function and, as an option, a Group-III facsimile (G3 FAX) function when the optional facsimile unit 30 is installed by a user choice to the multi-function apparatus 200. The option facsimile unit 30 includes the G3 FAX modem 10 and the network controller 11. The CPU 1 controls respective components of the multi-function apparatus 200 to perform a predetermined copying function control. The CPU 1 also performs a predetermined G3 FAX facsimile operation when the option facsimile unit 30 is optionally installed, as described above. The G3 FAX modem and the network controller 10 of the FAX unit 30 are interconnected to each other for a direct communications therebetween. When the FAX unit 30 is installed in the multi-function apparatus 200, the G3 FAX modem and the network controller 10 are interconnected to the internal bus 14 to communicate with other components.

Figure 6:
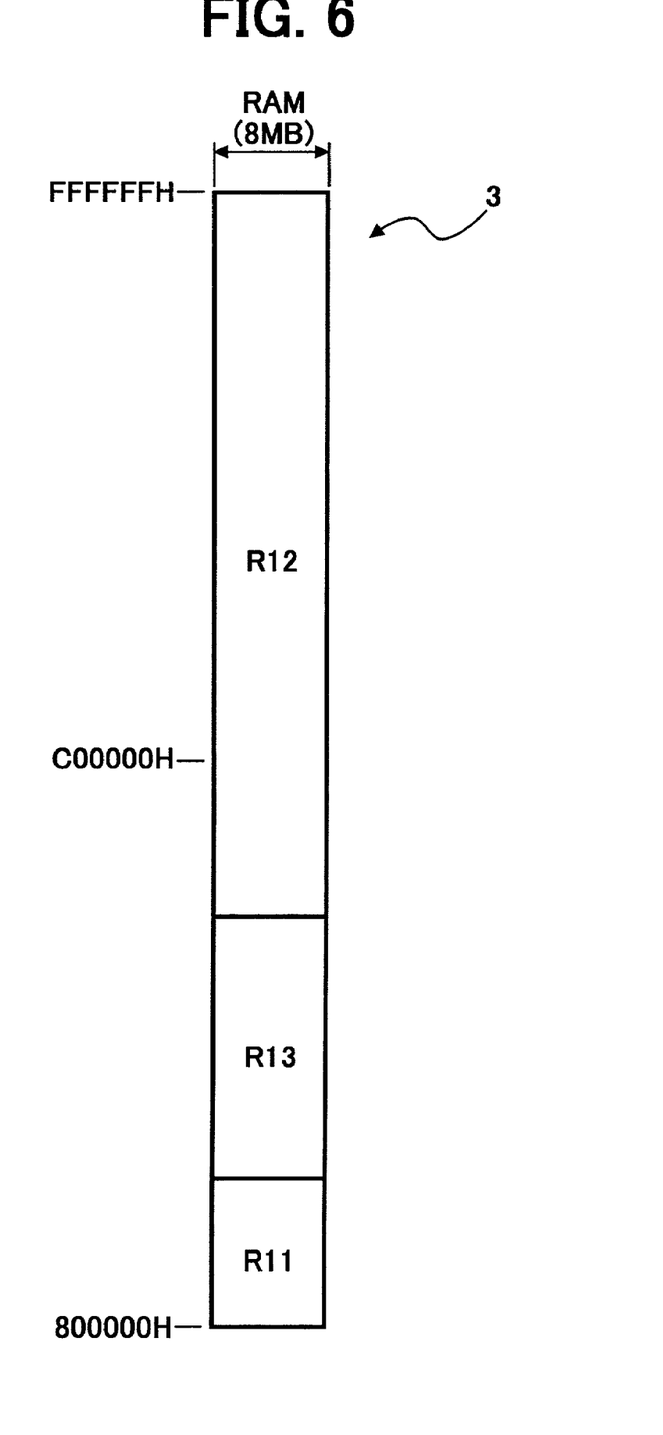
FIG. 6 is an illustration for explaining an exemplary memory map of a RAM (random access memory) when the add-on optional expansion memory is not mounted to the multi-function apparatus of FIG. 5.

FIG. 6 illustrates an exemplary memory map of the RAM 3 which shows functional allocation memory assignments of the RAM 3 when the expansion memory 13 is not mounted to the multi-function apparatus 200. In FIG. 6, the RAM 3 is divided by functional allocation when and as needed into memory areas R11, R12, and R13 in a manner similar to that shown in FIG. 2. The memory area R11 stores image data (i.e., image information) associated with the facsimile functions, and it may be referred to as a SAF (stored and forward) memory. The memory area R12 stores a page of image data which will be recorded on the printer 6, and therefore it may be referred to as a page memory. The memory area R13 is reserved as a working memory for the CPU 1. In this case, the RAM 3 has a memory capacity of 8 MB (megabyte) and the memory areas R11, R12, R13 have 1 MB, 5.3 MB, and 1.7 MB, respectively, for example.

Although the memory map of FIG. 6 includes the memory area R11 reserved for the facsimile function, such memory area R11 may be used for other functions such as the copying function, for example, when the FAX unit 30 is not installed.

Figure 7:
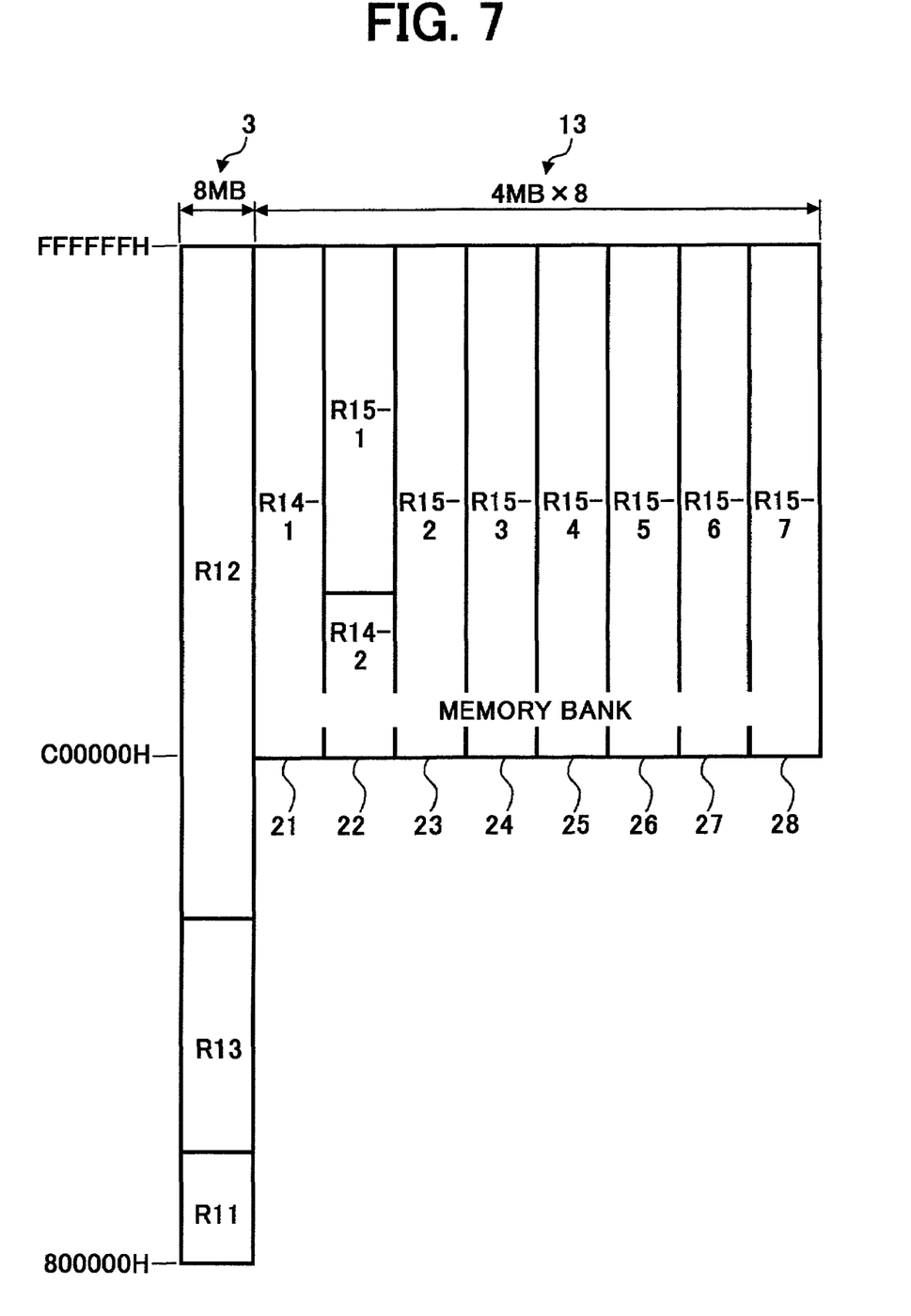
FIG. 7 is an illustration for explaining an exemplary memory map of the RAM and the add-on optional expansion memory mounted to the multi-function apparatus of FIG. 5.

FIG. 7 illustrates an exemplary memory map of the RAM 3 added with the expansion memory 13, which shows memory assignments of the RAM 3 and the expansion memory 13 when the expansion memory 13 is mounted to the multi-function apparatus 200 that has no FAX unit 30 installed therein. The RAM 3 is divided by functional allocation into the memory areas R11, R12, and R13, in a manner similar to that of FIG. 6. The memory sizes, for example, of 1 MB, 5.3 MB, and 1.7 MB are allocated to the memory areas R11, R12, and R13, respectively. In the example of a 32-MB expansion memory 13 composed of 4-MB memory banks 21–28, the memory bank 21 is assigned as a memory area R14-1 serving as a 4-MB page memory for the copying function. The memory bank 22 is divided into a memory area R14-2, having 1.3 MB, for accumulating page images for the copying function and a memory area 15-1, having 2.7 MB, for the copying function in a sorting mode. The remaining memory banks 23–28 having 24 MB in total are assigned as memory areas R15-2, R15-3, R15-4, R15-5, R15-6, and R15-7, respectively, which are used for the copying function in the sorting mode.

Although the memory map of FIG. 7 includes the memory area R11 reserved for the facsimile function, such memory are R11 may be used for other functions such as the copying function, for example, when the FAX unit 30 is not installed.

The FAX unit 30 may be installed by a user choice to the multi-function apparatus 200 in which the RAM 3 and the expansion memory 13 have the above-described memory assignments. Upon an installation of the FAX unit 30, the multi-function apparatus 200 changes the memory assignments of the RAM 3 and the expansion memory 13 into those of a memory map shown in FIG. 8 which are similar to the memory assignments shown in FIG. 3, in which a 4-MB memory is assigned as the SAF memory.

Figure 8:
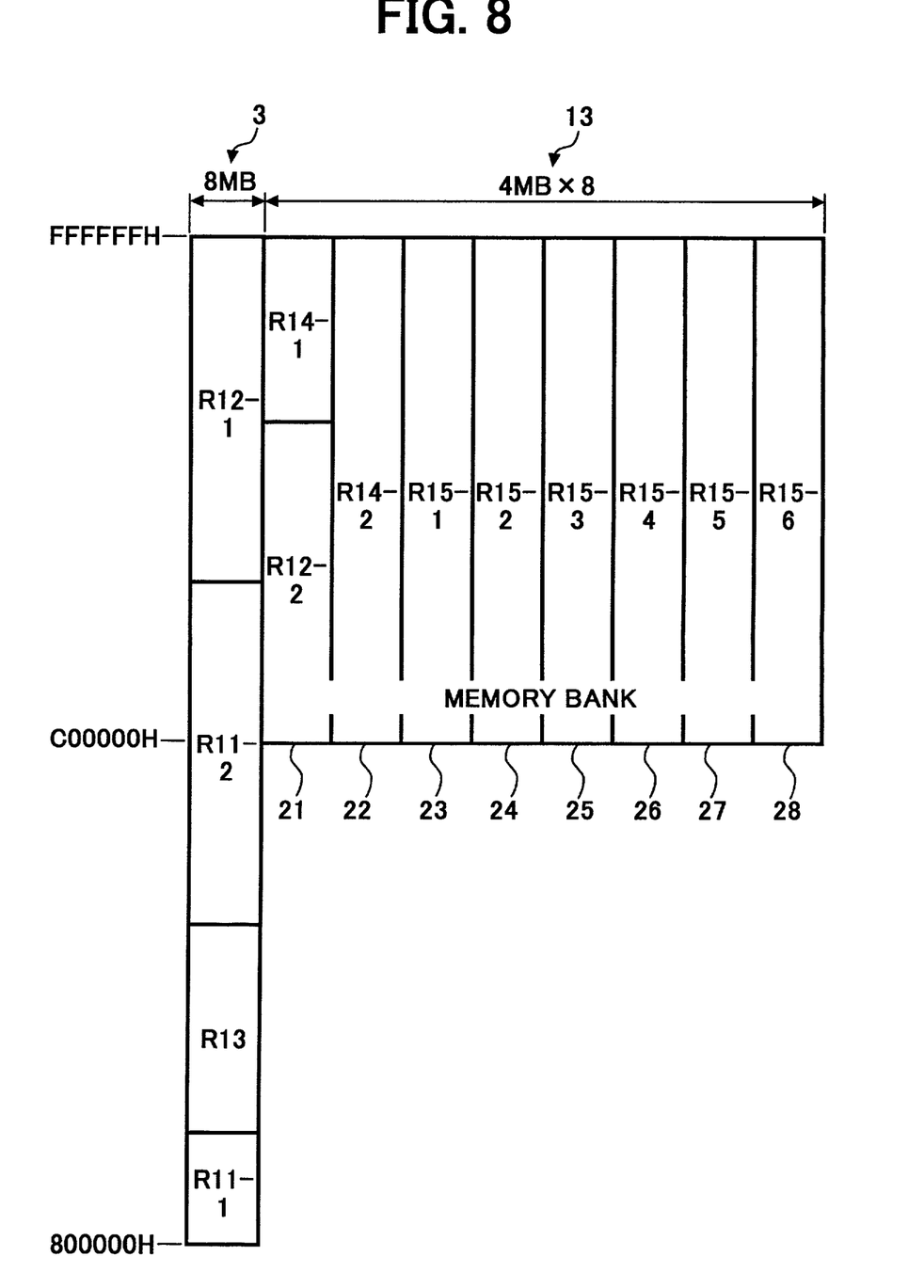
FIG. 8 is an illustration for explaining an exemplary memory map of the RAM and the add-on optional expansion memory when an option facsimile unit is mounted to the multi-function apparatus of FIG. 5.

In the memory map shown in FIG. 8, the RAM 3 is divided by functional allocation into the memory areas R11-1, R13, R11-2, and R12-1 having the memory sizes of, for example, 1 MB, 1.4 MB, 3 MB, and 2.6 MB, respectively. The memory areas R11-1 and R11-2, having 4 MB in total, serve as a storage of facsimile image information. The memory area R12-1 serves as a page memory for the copying function. The memory area R13 is served as a working memory area for the CPU 1. In the expansion memory 13, the memory bank 21 is divided by functional allocation into a memory area R12-2 having, for example, 2.7 MB for use in the copying function and a memory area R14-1 having, for example, 1.3 MB for accumulating page images for the copying function. The memory bank 22 is assigned as a memory area R14-2 having 4 MB for accumulating page images for the copying function. The remaining memory banks 23–28 having 24 MB in total are assigned as memory areas R15-1, R15-2, R15-3, R15-4, R15-5, and R15-6, respectively, which are used for the copying function in a sorting mode.

Figure 9:
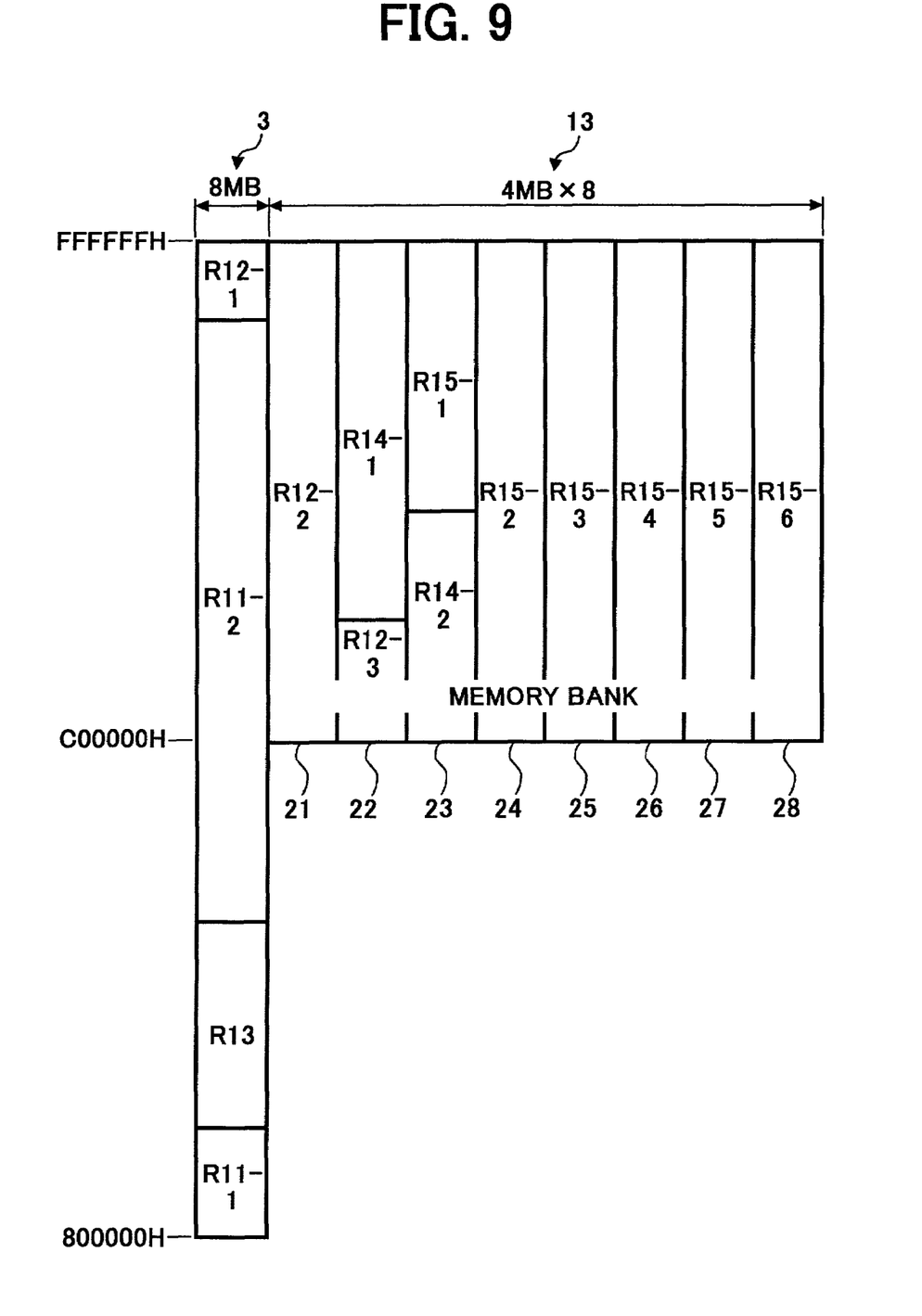
FIG. 9 is an illustration for explaining another exemplary memory map of the RAM and the add-on optional expansion memory when an option facsimile unit is mounted to the multi-function apparatus of FIG. 5.

The memory area R11 having 4 MB in the above-described configuration may be arranged to have a different memory size. FIG. 9 illustrates another exemplary memory map of the RAM 3 and the expansion memory 13, which shows memory assignments that assign 6 MB to the memory area R11. In this case, the memory areas R11-1, R13, R11-2, and R12-1 of the RAM 3 have, for example, 1 MB, 1.4 MB, 5 MB, and 0.6 MB, respectively. Thus, the memory area R11 composed of the memory areas R11-1 and R11-2 has 6 MB in total. In the expansion memory 13, the memory bank 21 is allocated as the memory area R12-2 having 4 MB for use in the copying function. The memory bank 22 is divided, for example, into the memory area R12-3 having 0.7 MB as the page memory for the copying function and the memory area R14-1 having 3.3 MB as a page memory for accumulating page images for the copying function. The memory bank 23 is divided into the memory area 14-2 having 2 MB as another page memory for accumulating page images for the copying function and the memory area 15-1 having 2 MB for the copying function in the sorting mode. The remaining memory banks 24–28 having 20 MB in total are assigned as the memory areas R15-2, R15-3, R15-4, R15-5, and R15-6, respectively, and are used for the copying function in the sorting mode.

The multi-function apparatus 200 having the expansion memory 13 and the FAX unit 30 may thus expand the memory area R1 (i.e., the SAF memory) to 6 MB, thereby performing versatile functions based on the facsimile functions. In addition, the memory area R1 composed of the memory areas R1-1 and R1-2 is located in the RAM 3 backed up with the battery 4 and therefore the accumulated image data associated with the facsimile function are safely retained even when other power to the apparatus is turned off. With this configuration, the multi-function apparatus 200 can properly perform special facsimile functions such as a facsimile transmission with time designation, a facsimile transmission with confidentiality, and a proxy facsimile receiving.

It should be noted that the power to the multi-function apparatus 200 should be turned off when the above-described expansion memory 13 is installed to or removed from the multi-function apparatus 200. Accordingly, the CPU 1 should check for presence of the expansion memory 13 during an initialization operation at a power-up time.

Figure 10:
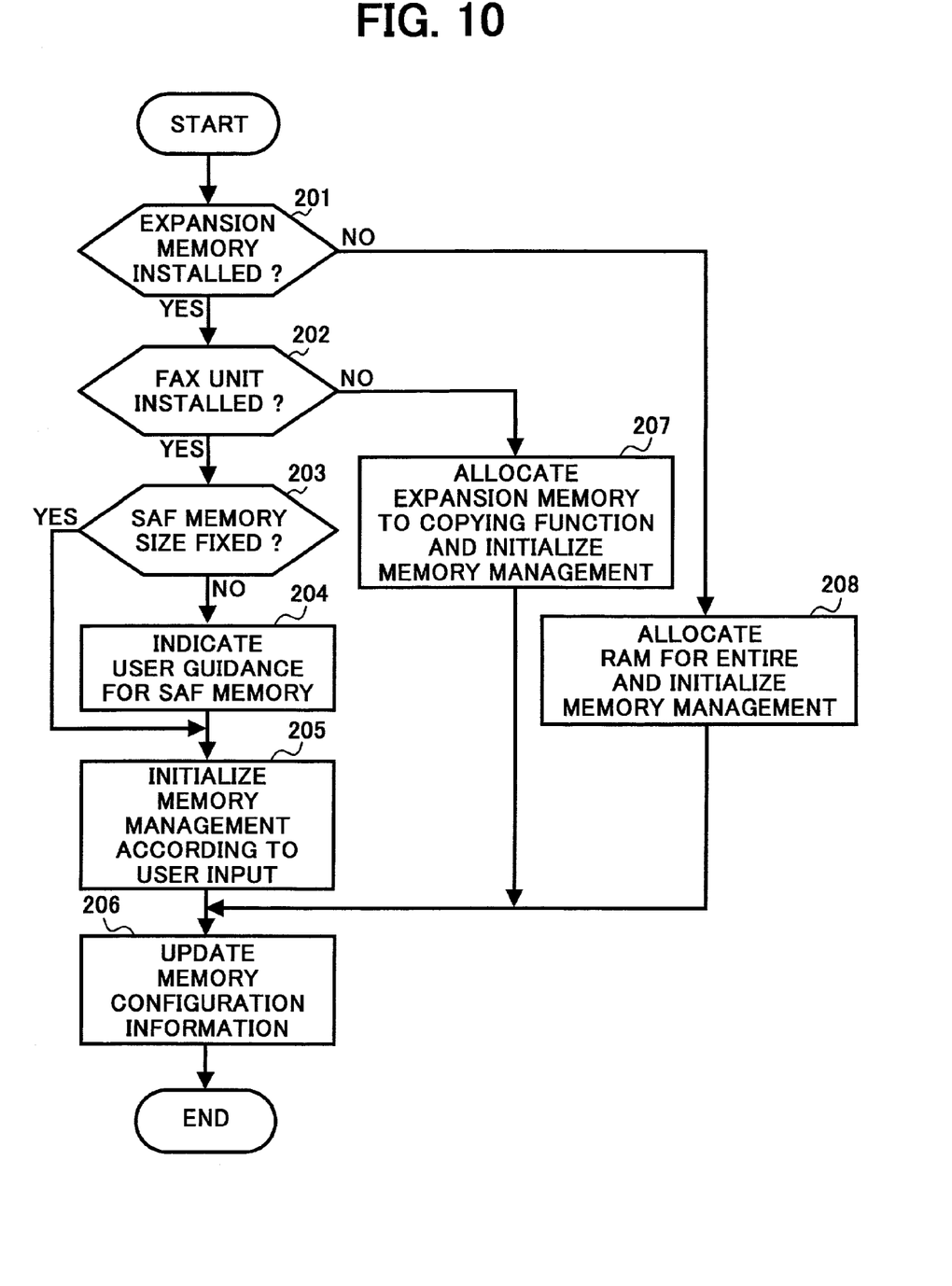
FIG. 10 is a flowchart for explaining an exemplary procedure of an initialization process performed by the multi-function apparatus of FIG. 5.

Referring to FIG. 10, an exemplary procedure of the initialization operation performed by the multi-function apparatus 200 is explained. As illustrated in FIG. 10, when the initialization operation is started, the CPU 1 checks in Step S201 whether the expansion memory 13 is mounted to the multi-function apparatus 200. If the check result of Step S201 is YES, the CPU 1 then checks in Step S202 whether the FAX unit 30 is installed in the multi-function apparatus 200. If the check result of Step S202 is YES, the CPU 1 further checks in Step S203 whether a memory allocation has been carried out on the SAF memory (i.e., the memory area R1).

If the check result of Step S203 is NO, the CPU 1 proceeds to Step S204 to instruct the console 8 to provide user guidance indicating that the user is required to determine a memory size of the SAF memory. If the check result of Step S203 is YES, the CPU 1 skips the process of Step S204. Upon a determination of the SAF memory size by the user, the CPU 1 initializes the memory management in Step S205 in accordance with the determination of the SAF memory size by the user and under the conditions that the expansion memory 13 is mounted to the multi-function apparatus 200. Then, the CPU 1 proceeds to Step S206 in which the CPU 1 updates the memory configuration information to the conditions that the expansion memory 13 is mounted, as illustrated in FIG. 8 or FIG. 9. The process then ends.

When the expansion memory 13 is attached but the FAX unit 30 is not, the check result of Step S202 will be NO and the CPU 1 will proceed to Step S207. In Step S207, the CPU 1 allocates the entire memory capacity of the expansion memory 13 to the memory areas R14 and R15 for the use of the copying function, as shown in FIG. 7, and initializes the memory configuration information accordingly. Then, the CPU 1 proceeds to Step S206 to update the memory configuration information to the conditions in that the expansion memory 13 is mounted, as described above. The CPU 1 then ends the process.

When the expansion memory 13 is not mounted and the check result of Step S201 is NO, the CPU 1 proceeds to Step S208. In Step S208, the CPU 1 allocates the memory capacity of the RAM 3 in the manner as shown in FIG. 6, and initializes the memory configuration information accordingly. Then, the CPU 1 proceeds to Step S206 to update the memory configuration information to the conditions in that the expansion memory 13 is not mounted, as described above. The CPU 1 then ends the process.

The disclosure of this patent specification may be conveniently implemented using a conventional general purpose digital computer programmed according to the teaching of the present specification, as will be apparent to those skilled in the computer art. Appropriate software coding can readily be prepared by skilled programmers based on the teachings of the present disclosure, as will be apparent to those skilled in the software art. The disclosure of this patent specification may also be implemented by the preparation of application specific integrated circuits or by interconnecting an appropriate network of conventional component circuits, as will be readily apparent to those skilled in the art. When reference is made to dividing memory into areas, it should be clear that this includes functional allocation in which the system keeps track of address for respective types of information, without necessarily using physically separate memory areas.

Numerous additional modifications and variations are possible in light of the above teachings. It is therefore to be understood that within the scope of the appended claims, the disclosure of this patent specification may be practiced otherwise than as specifically described herein.

This application is based on Japanese patent applications, No. JPAP2000-343855 filed on Nov. 11, 2000 and No. JPAP2001-089835 filed on Mar. 27, 2001 in the Japanese Patent Office, the entire contents of which are incorporated by reference herein.

What is claimed is:

1. A multi-function apparatus performing at least copying and facsimile functions, comprising:
   a basic memory including at least a first image memory area for storing data of the copying function and a second image memory area for storing data of the facsimile function;
   a socket for connecting an add-on expansion memory; and
   a controller configured to arrange memory assignments of said basic memory in accordance with a first memory map to effectively perform operations of the copying and facsimile functions when said expansion memory is not connected to said socket and to rearrange said memory assignments of said basic memory together with said expansion memory with an effect of expanding said first and second image memory areas of said basic memory in accordance with a second memory map to effectively perform said operations of the copying and facsimile functions when said expansion memory is connected to said socket.

2. A multi-function apparatus as defined in claim 1, further comprising a backup battery that energizes said basic memory while other power to said apparatus is turned off, wherein said second image memory area is allocated within said basic memory when said expansion memory is mounted to said socket.

3. A multi-function apparatus as defined in claim 1, wherein said controller returns an arrangement of the memory assignments from that in accordance with said second memory map to that in accordance with said first memory map when said expansion memory is removed from said socket.

4. A multi-function apparatus as defined in claim 1, wherein said controller provides a user guidance with a warning that said expansion memory is connected to said socket while said second image memory area retains effective image data therein.

5. A multi-function apparatus as defined in claim 1, wherein said controller provides a user guidance with a warning that said expansion memory is absent from said socket while said second image memory area retains effective image data therein.

6. A multi-function apparatus performing at least copying function and an optional facsimile function, comprising:
   a basic memory including at least a first image memory area for storing data of the copying function;
   a socket for connecting an add-on expansion memory; and
   a controller configured to arrange memory assignments of said basic memory and said expansion memory in accordance with a predetermined memory map so that a second image memory area for the optional facsimile function is allocated within said basic memory when said expansion memory is connected to said socket and the optional facsimile function is added to said apparatus.

7. A multi-function apparatus as defined in claim 6, further comprising a backup battery that backs up said basic memory.

8. A multi-function apparatus as defined in claim 6, wherein a memory size of said second image memory area is determined by a user.

9. A multi-function apparatus performing at least copying and facsimile functions, comprising:
   first storing means for storing data of the copying function;
   second storing means for storing data of the facsimile function;
   connecting means for connecting an add-on expansion memory; and
   controlling means for arranging memory assignments of said first and second storing means in accordance with a first memory map to effectively perform operations of the copying and facsimile functions when said expansion memory is not connected to said socket and for rearranging said memory assignments of said first and second storing means together with said expansion memory with an effect of expanding memory areas for said data of said first and second storing means in accordance with a second memory map to effectively perform said operations of the copying and facsimile functions when said expansion memory is connected to said connecting means.

10. A multi-function apparatus as defined in claim 9, further comprising battery means for energizing at least said second storing means while other power to said apparatus is turned off.

11. A multi-function apparatus as defined in claim 9, wherein said controlling means returns an arrangement of the memory assignments from that in accordance with said second memory map to that in accordance with said first memory map when said expansion memory is removed from said connecting means.

12. A multi-function apparatus as defined in claim 9, wherein said controlling means provides a user guidance warning that said expansion memory is connected to said connecting means while said area of said second storing means retains effective image data therein.

13. A multi-function apparatus as defined in claim 9, wherein said controlling means provides a user guidance warning that said expansion memory is absent from said connecting means while said area of said second storing means retains effective image data therein.

14. A multi-function apparatus performing at least copying function and an optional facsimile function, comprising:
   storing means for storing data of the copying function;
   connecting means for connecting an add-on expansion memory; and
   controlling means for arranging memory assignments of memory areas of said storing means and said expansion memory in accordance with a predetermined memory map so that a specific memory area for the optional facsimile function is allocated within said storing means when said expansion memory is connected to said connecting means and the optional facsimile function is added to said apparatus.

15. A multi-function apparatus as defined in claim 14, further comprising backup battery means for energizing at least said storing means while other power to said apparatus is turned off.

16. A multi-function apparatus as defined in claim 14, wherein a memory size of said specific memory area is determined by a user.

17. A method for multi-function performance of at least copying and facsimile functions, comprising the steps of:
providing a basic memory including a first memory area for storing data of the copying function and a second memory area for storing data of the facsimile function;
preparing a socket for connecting an expansion memory;
arranging memory assignments of said basic memory in accordance with a first memory map to effectively perform operations of the copying and facsimile functions when said expansion memory is not connected to said socket; and
rearranging said memory assignments of said basic memory together with said expansion memory with an effect of expanding said first and second memory areas storing said data of the copying and of facsimile functions in accordance with a second memory map to effectively perform said operations of the copying and facsimile functions when said expansion memory is connected to said socket.

18. A method as defined in claim 17, further comprising a step of energizing at least said basic memory while other power to the multi-function performance is turned off.

19. A method as defined in claim 17, further comprising a step of returning an arrangement of the memory assignments from that in accordance with said second memory map to that in accordance with said first memory map when said expansion memory is removed from said socket.

20. A method as defined in claim 17, further comprising a step of providing a user guidance warning that said expansion memory is connected to said socket while said second memory area retains effective image data therein.

21. A method as defined in claim 17, further comprising a step of providing a user guidance warning that said expansion memory is absent from said socket while said second memory area retains effective image data therein.

22. A method for multi-function performance of at least copying function and an optional facsimile function, comprising the steps of:
providing a basic memory for storing data of the copying function;
preparing a socket for connecting an add-on expansion memory;
arranging memory assignments of memory areas of said basic memory and said expansion memory in accordance with a predetermined memory map so that a specific memory area for the optional facsimile function is allocated within said basic memory when said expansion memory is connected to said socket and the optional facsimile function is made available.

23. A method as defined in claim 22, further comprising a step of energizing at least said basic memory while other power for said multi-function performance is turned off.

24. A method as defined in claim 22, wherein a memory size of said specific memory area is determined by a user.

25. A multi-function apparatus performing at least copying and facsimile functions, comprising:
a basic memory including at least first image memory provisions storing data related to the copying function and second image memory provisions storing data related to the facsimile function;
a coupling facility for selectively connecting add-on expansion memory provisions thereto; and
a controller communicating with said basic memory and coupling facility and configured to arrange memory assignments of said basic memory in accordance with a first memory map to effectively perform operations of the copying and facsimile functions when said expansion memory provisions are not connected to said coupling facility and to rearrange said memory assignments of said basic memory and to arrange memory assignment of said expansion memory provisions in accordance with a second memory map to thereby provide expanded memory resources for effectively performing said operations of the copying and facsimile functions when said expansion memory provisions are connected to said coupling facility.

26. A multi-function apparatus as in claim 25, wherein said controller includes provisions for returning an arrangement of the memory assignments from an arrangement related to said second memory map to an arrangement related to said first memory map in response to removal of said expansion memory provisions from said coupling facility.

27. A multi-function apparatus as in claim 25 including a unit providing status indications to users, wherein said controller includes provisions causing said unit to indicate whether or not said expansion memory provisions are connected to said coupling facility while said second image memory provisions retain effective image data therein.

28. A multi-function apparatus performing at least a copying function and optionally performing a facsimile function, comprising:
a basic memory including at least first image memory provisions for storing data related to the copying function;
a coupling facility for selectively connecting add-on expansion memory provisions thereto; and
a controller communicating with said basic memory and said coupling facility and configured to respond to a connection of said expansion memory provisions to said coupling facility by (a) arranging memory assignments of said basic memory and said expansion memory provisions in accordance with a predetermined memory map such that second image memory provisions are allocated within said basic memory and said expansion memory provisions related to said optional facsimile function, and (b) enabling performance of the optional facsimile function by said apparatus.

29. A method of providing at least copying and facsimile functions in a multi-function apparatus comprising:
allocating resources of a basic memory to provide first memory provisions for storing data related to the copying function and second memory provisions for storing data related to the facsimile function;
selectively connecting expansion memory provisions to said apparatus;
automatically determining whether of not said expansion memory provisions are connected and (a) responding to a determination that the expansion memory provisions are not connected by arranging memory assignments of said basic memory in accordance with a first memory map to effectively perform operations of the copying and facsimile functions, and (b) responding to a determination that the expansion memory provisions are connected to rearrange said memory assignments of said basic memory and arrange memory assignments of said expansion memory provisions to store data related to the copying and facsimile functions in accordance with a second memory map, different from said first map, to thereby effectively perform said operations of the copying and facsimile functions in a different manner.

30. A method of performing at least a copying function and an optional facsimile function in a multi-function apparatus comprising:

provi­ding a basic memory for storing data related at least to the copying function;

selectively connecting add-on expansion memory provisions to said apparatus;

automatically determining whether or not the expansion memory provisions are connected to said apparatus and, in response to a determination that they are connected, arranging memory assignments of said basic memory and said expansion memory provisions in accordance with a predetermined memory to (a) allocate memory resources of the basic memory for the optional facsimile function, and (b) enable performance of said optional facsimile function.

* * * * *